United States Patent
Huang et al.

(10) Patent No.: US 12,481,581 B2
(45) Date of Patent: Nov. 25, 2025

(54) APPARATUS AND METHOD THEREOF FOR DRAM INITIALIZATION

(71) Applicant: MEDIATEK INC., Hsinchu (TW)

(72) Inventors: Guan-Jie Huang, Hsinchu (TW); Chengchun Ni, Anhui (CN); Jing-Xian Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 44 days.

(21) Appl. No.: 18/594,408

(22) Filed: Mar. 4, 2024

(65) Prior Publication Data

US 2025/0208993 A1    Jun. 26, 2025

(30) Foreign Application Priority Data

Dec. 20, 2023  (CN) .......................... 202311778773.8

(51) Int. Cl.
  *G06F 12/02*    (2006.01)
(52) U.S. Cl.
  CPC ................................ *G06F 12/0238* (2013.01)
(58) Field of Classification Search
  CPC .................................................. G06F 12/0238
  See application file for complete search history.

(56) References Cited

U.S. PATENT DOCUMENTS

| | | | | |
|---|---|---|---|---|
| 2002/0161993 | A1* | 10/2002 | Chan | G06F 12/0638 711/E12.083 |
| 2008/0126776 | A1* | 5/2008 | Takayama | G06F 9/4401 713/1 |
| 2008/0130343 | A1* | 6/2008 | Janzen | G11C 7/04 365/51 |
| 2013/0238836 | A1* | 9/2013 | Suzuki | G11C 16/3495 711/E12.008 |

* cited by examiner

*Primary Examiner* — Aracelis Ruiz
(74) *Attorney, Agent, or Firm* — McClure, Qualey & Rodack, LLP (57) ABSTRACT

An apparatus is provided herein, which includes a memory device. The memory device includes a memory array, a storage device, and a memory controller. The storage device stores access parameters corresponding to a plurality of access modes. The memory controller accesses the memory array with the access parameters corresponding to one of the access modes. When the memory device is booted up, the memory controller flushes the access parameters corresponding to each of the access modes to the storage device.

10 Claims, 5 Drawing Sheets

APPARATUS AND METHOD THEREOF FOR DRAM INITIALIZATION

CROSS REFERENCE TO RELATED APPLICATIONS

This application claims priority of China Patent Application No. 202311778773.8, filed on Dec. 20, 2023, the entirety of which is incorporated by reference herein.

BACKGROUND OF THE INVENTION

Field of the Invention

The disclosure is generally related to memory and, more particularly, to apparatuses and methods thereof for DRAM initialization.

Description of the Related Art

Dynamic random access memory (DRAM) devices are volatile memory devices. Therefore, when power is no longer supplied to a DRAM device, its contents and operating configurations typically may not be retained. Each time a DRAM device is powered up, a predefined sequence of steps is required to initialize the internal state of the DRAM device and to configure user-defined operating parameters.

Conventional main memory subsystems, however, rely on an external controller, such as a central processing unit (CPU), to perform initialization operations. Accordingly, large amounts of data must typically be communicated back and forth between the CPU and memory to perform initialization. Due to this arrangement, initialization causes high latency as large amounts of data are transferred over the memory bus. This consumes high amounts of bandwidth and power.

Thus, more efficient methods and apparatuses for DRAM initialization are desirable.

BRIEF SUMMARY OF THE INVENTION

Apparatuses and operation methods thereof for DRAM initialization are provided herein. Since the access parameters are flushed to the storage device and only the access parameter that should be corrected is corrected, the time for initialization can be significantly reduced, which is up to one-tenth. In addition, when the access parameter that should be corrected is corrected, the resource of CPU is released and the calibration and correction is handover to the additional processor in the memory device, the time for initializing the whole apparatus should be reduced as well. Furthermore, since the processor corrects the access parameters based on those flushed to the storage device, the time for correction is reduced to further improve the time for the memory device's initialization.

In an embodiment, an apparatus is provided, which comprises a memory device. The memory device comprises a memory array, a storage device, and a memory controller. The storage device stores access parameters corresponding to a plurality of access modes. The memory controller accesses the memory array with the access parameters corresponding to one of the access modes. When the memory device is booted up, the memory controller flushes the access parameters corresponding to each of the access modes to the storage device.

According to an embodiment of the invention, the apparatus further comprises a non-volatile memory device. The non-volatile memory device stores all the access parameters corresponding to all of the access modes. When the memory device is booted up, the memory controller flushes the access parameters corresponding to all of the access modes from the non-volatile memory device to the storage device.

According to an embodiment of the invention, the apparatus further comprises a preloader. The preloader boots up the memory device. When the memory device is shut down, the preloader flushes the access parameters corresponding to each of the access modes from the storage device to the non-volatile memory device.

According to an embodiment of the invention, when the preloader boots up the memory device for the first time, the preloader calibrates the access parameters corresponding to each of the access modes, and then stores the access parameters corresponding to each of the access modes in the storage device.

According to an embodiment of the invention, when the preloader boots up the memory device once again, the preloader flushes the access parameters corresponding to each of the access modes from the non-volatile memory device to the storage device.

According to an embodiment of the invention, memory device further comprises a processor. When the preloader boots up the memory device once again, the processor corrects the respective access parameters corresponding to each of the access modes stored in the storage device according to an operation environment after the preloader flushes the access parameters corresponding to each of the access modes from the non-volatile memory device to the storage device.

According to an embodiment of the invention, the preloader is a central processing unit executing a memory driver. When the processor corrects the respective access parameters corresponding to each of the access modes stored in the storage device, the central processing unit is released and able to initialize other devices.

According to an embodiment of the invention, the non-volatile memory device is a flash memory.

In another embodiment, an operation method adapted to a memory device is provided. The memory device comprises a memory array and a storage device. The operation method comprises the following steps. The memory device is booted up. Access parameters corresponding to a plurality of access modes are flushed to the storage device when the memory device is booted up. The memory array is accessed with the access parameters corresponding to one of the access modes stored in the storage device.

According to an embodiment of the invention, the operation method further comprises the following steps. The access parameters corresponding to each of the access modes are calibrated using a preloader when the memory device is booted up for the first time. The access parameters corresponding to each of the access modes are stored in the storage device after the step of calibrating the access parameters corresponding to each of the access modes.

According to an embodiment of the invention, the operation method further comprises the following steps. All the access parameters corresponding to each of the access modes are flushed from a non-volatile memory device to the storage device when the memory device is booted up once again.

According to an embodiment of the invention, the operation method further comprises the following steps. The access parameters corresponding to each of the access modes are flushed from the storage device to the non-volatile memory device when the memory device is shut down.

According to an embodiment of the invention, the operation method further comprises the following steps. The respective access parameters corresponding to each of the access modes stored in the storage device are corrected using a processor according to an operation environment after the step of flushing the access parameters corresponding to all of the access modes from the non-volatile memory device to the storage device when the circuit is booted up once again.

According to an embodiment of the invention, the preloader is a central processing unit executing a memory driver, and the non-volatile memory device is a flash memory. When the respective access parameters corresponding to each of the access modes are corrected by the processor, the central processing unit is released and able to initialize other devices.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure may be an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the drawings, similar elements and/or features may have the same reference number. Various components of the same type can be distinguished by adding letters or numbers after the component symbol to distinguish similar components and/or similar features.

Figure 1:
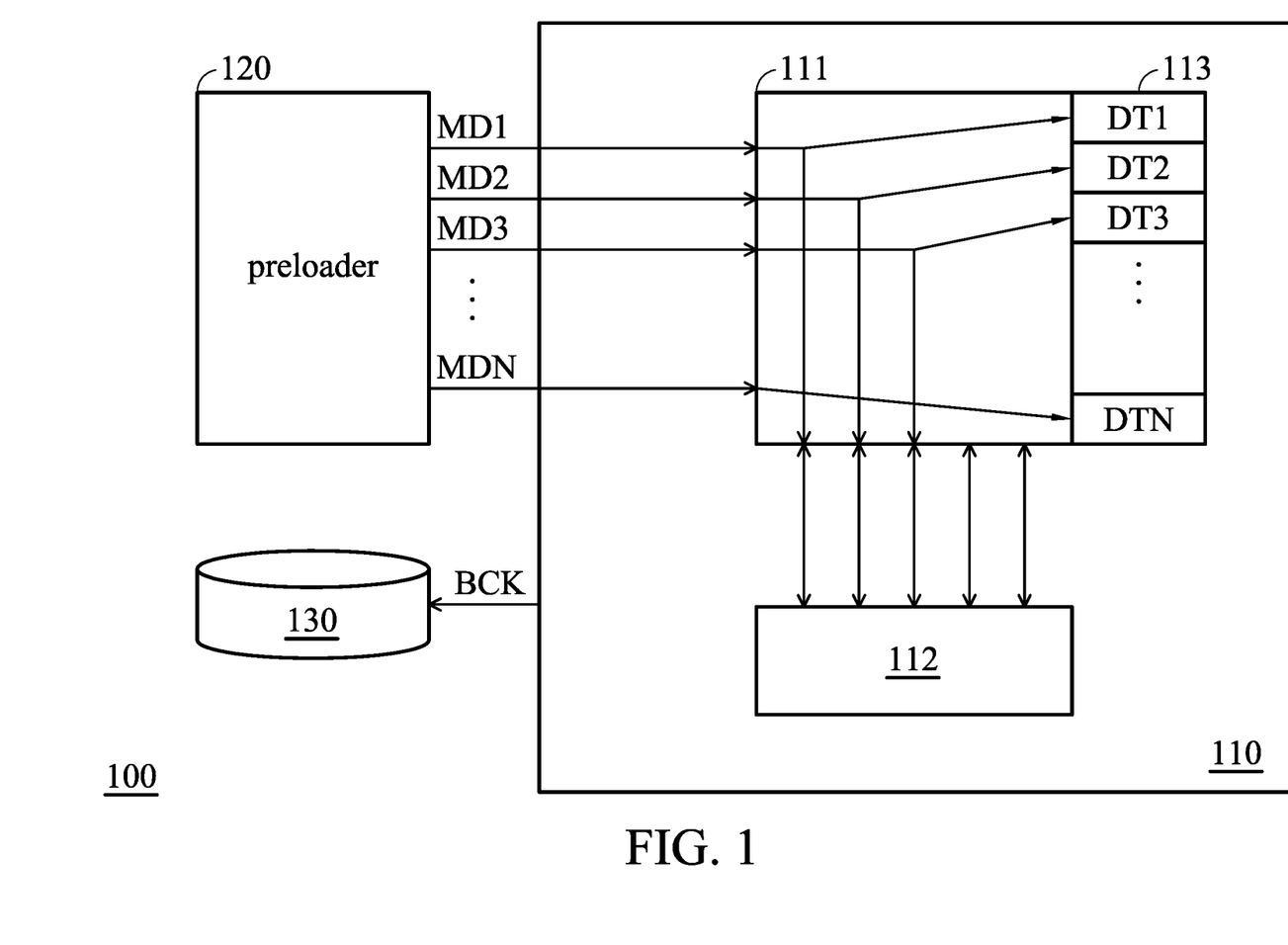
FIG. 1 is a schematic diagram of a semiconductor device in accordance with an embodiment of the invention.

FIG. 1 is a schematic diagram of a semiconductor device in accordance with an embodiment of the invention. As shown in FIG. 1, the semiconductor device 100 includes a memory device 110, a preloader 120, and a non-volatile memory device 130. According to an embodiment of the invention, the memory device 110 may be a dynamic random access memory (DRAM) device.

The memory device 110, which is coupled to the preloader 120 and the non-volatile memory device 130, includes a memory controller 111, a memory array 112, and a storage device 113. According to an embodiment of the invention, the storage device 113 may be a static random-access memory (SRAM). In one embodiment, the storage device may be a shuffle SRAM with size of 60 KB.

The memory controller 111 accesses the memory array 112 according to the access parameters related to the first mode data DT1, the second mode data DT2, the third mode data DT3 . . . and the N-th mode data DTN stored in the storage device 113. The first mode data DT1, the second mode data DT2, the third mode data DT3 . . . and the N-th mode data DTN stored in the storage device 113 will be described in more detail in the following paragraphs.

The preloader 120 may operate the memory device 110 in one of the first access mode MD1, the second access mode MD2, the third access mode MD3 . . . and the N-th access mode MDN. According to an embodiment of the invention, when the preloader 120 boots up the memory device 110 for the very first time, the preloader 120 performs an initialization operation on the memory device 110.

During the initialization operation, the preloader 120 calibrates the operations and communication between the memory controller 111 and the memory array 112 based on each of the first access mode MD1, the second access mode MD2, the third access mode MD3 . . . and the N-th access mode MDN. In addition, the preloader 120 stores the access parameters related to the first access mode MD1, the second access mode MD2, the third access mode MD3 . . . and the N-th access mode MDN as the first mode data DT1, the second mode data DT2, the third mode data DT3 . . . and the N-th mode data DTN, which are obtained during the initialization, in the storage device 113.

According to an embodiment of the invention, the preloader 120 may be a central processing unit executing DRAM driver. According to an embodiment of the invention, the non-volatile memory device 130 may be a flash memory.

According to an embodiment of the invention, when the memory device 110 is shut down after the initialization operation, the preloader 120 flushes all the first mode data DT1, the second mode data DT2, the third mode data DT3 . . . and the N-th mode data DTN in the storage device 113 to the non-volatile memory device 130 as the backup signal BCK. Therefore, the first mode data DT1, the second mode data DT2, the third mode data DT3 . . . and the N-th mode data DTN may be retained for the next time that the memory device 110 boots up. According to some embodiments of the invention, the very first time to boots up the memory device 110 is mostly done in the factory.

Figure 2:
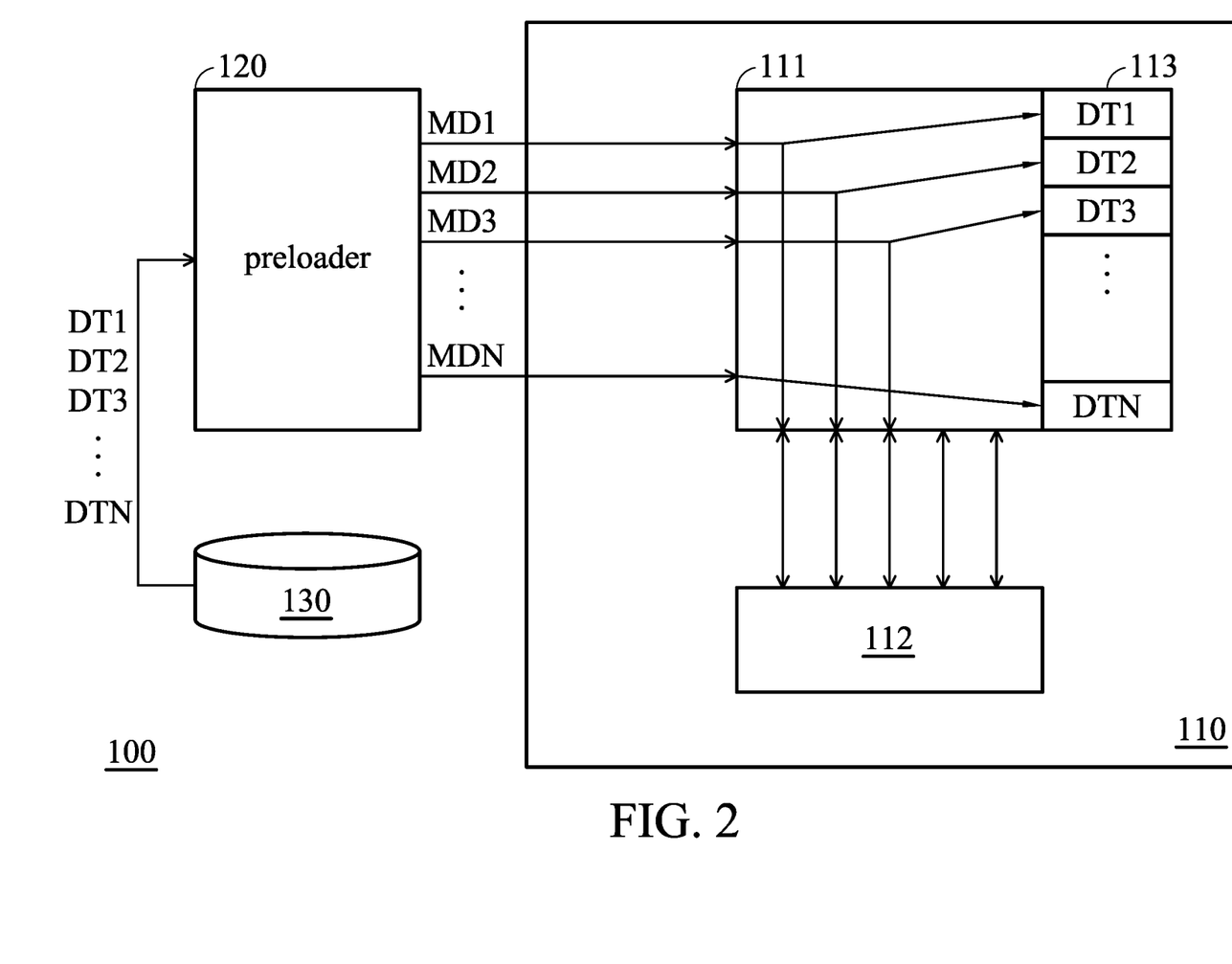
FIG. 2 is a schematic diagram of a semiconductor device in accordance with another embodiment of the invention.

FIG. 2 is a schematic diagram of a semiconductor device in accordance with another embodiment of the invention, in which the preloader 120 boots up the memory device 110 once again. As shown in FIG. 2, when the preloader 120 boots up the memory device 110 once again, the preloader 120 individually loads the first mode data DT1, the second mode data DT2, the third mode data DT3 . . . and the N-th mode data DTN from the non-volatile memory device 130 to the storage device 113, and corrects the access parameters of each of the first mode data DT1, the second mode data DT2, the third mode data DT3 . . . and the N-th mode data DTN according to the operation environment.

For example, when the preloader 120 loads the first mode data DT1 to the storage device 113, the preloader 120 calibrates the access parameters related to the first mode data DT1 according to the operation environment. After the access parameters related to the first mode data DT1 have been calibrated, the preloader 120 then loads the second mode data DT2 to the storage device 113, and so on. According to some embodiments of the invention, the first mode data DT1, the second mode data DT2, the third mode data DT3 . . . and the N-th mode data DTN may be loaded to the storage device 113 through Direct Memory Access (DMA).

However, when the preloader 120 restores the first mode data DT1, the second mode data DT2, the third mode data DT3 . . . and the N-th mode data DTN to the storage device 113, the preloader 120 also re-calibrates the access parameters corresponding to the first access mode MD1, the second access mode MD2, the third access mode MD3 . . . and the N-th access mode MDN, which is time-consuming and low efficiency. In addition, since the preloader 120 has to re-calibrate for each of the first access mode MD1, the second access mode MD2, the third access mode MD3 . . . and the N-th access mode MDN once the memory device 110 is booted up, the resource of CPU is occupied for a quite long period, leading to low efficiency, time consuming, and also power consuming.

Figure 3:
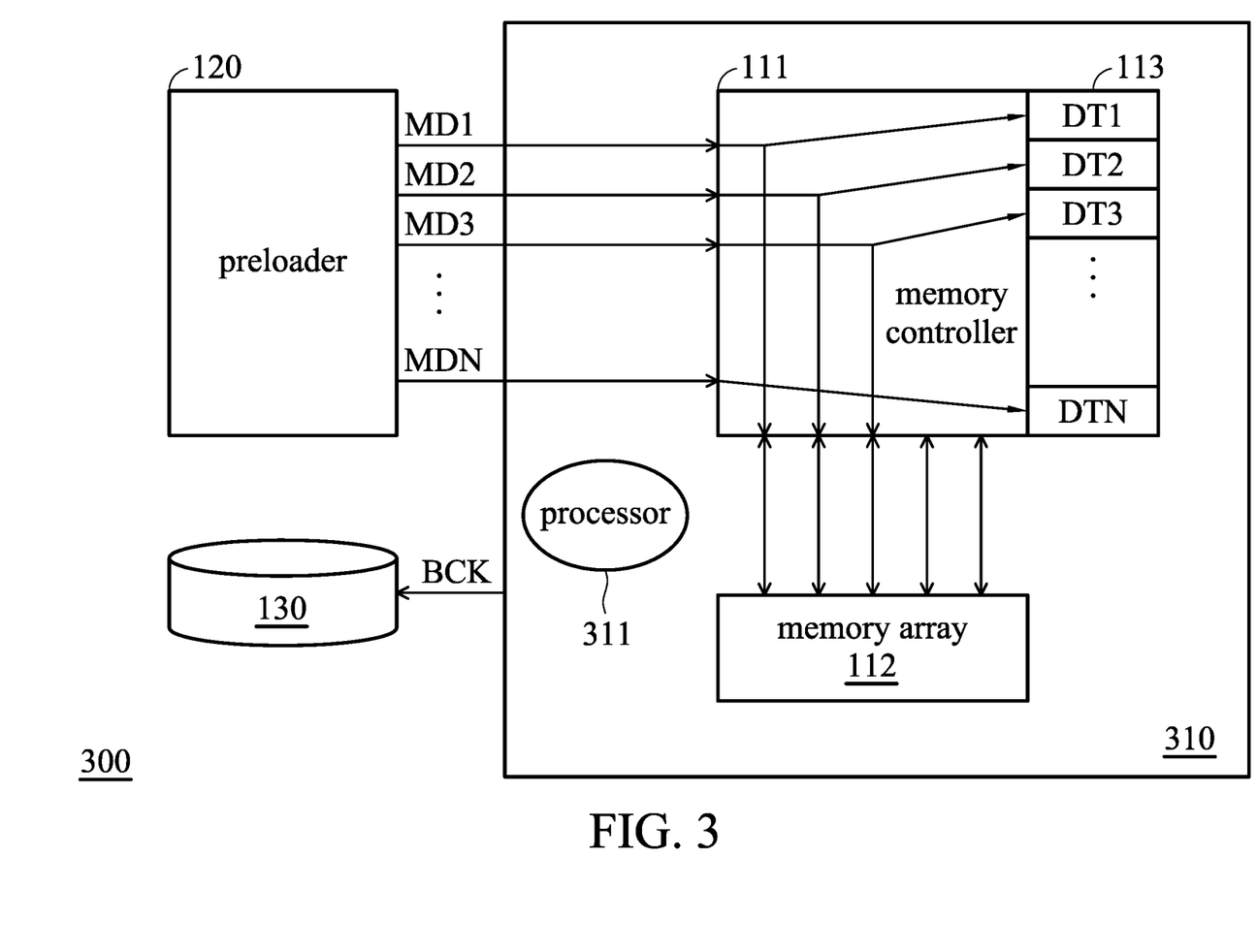
FIG. 3 is a schematic diagram of a semiconductor device in accordance with yet another embodiment of the invention.

FIG. 3 is a schematic diagram of a semiconductor device in accordance with yet another embodiment of the invention. As shown in FIG. 3, the semiconductor device 300 includes the memory device 310. Comparing the memory device 310 with the memory device 110 in FIG. 1, the memory device 310 further includes the processor 311.

According to an embodiment of the invention, as shown in FIG. 3, when the preloader 120 boots up the memory device 310 for the very first time, the preloader 120 performs an initialization operation on the memory device 310. During the initialization operation, the preloader 120 calibrates the operations and communication between the memory controller 111 and the memory array 112 based on each of the first access mode MD1, the second access mode MD2, the third access mode MD3 . . . and the N-th access mode MDN.

In addition, the preloader 120 stores the access parameters related to the first access mode MD1, the second access mode MD2, the third access mode MD3 . . . and the N-th access mode MDN as the first mode data DT1, the second mode data DT2, the third mode data DT3 . . . and the N-th mode data DTN, which are obtained during the initialization, in the storage device 113.

According to an embodiment of the invention, when the memory device 310 is shut down after the initialization operation, the preloader 120 flushes all the first mode data DT1, the second mode data DT2, the third mode data DT3 . . . and the N-th mode data DTN in the storage device 113 to the non-volatile memory device 130 as the backup signal BCK. Therefore, the first mode data DT1, the second mode data DT2, the third mode data DT3 . . . and the N-th mode data DTN may be retained for the next time that the memory device 310 boots up. According to some embodiments of the invention, the very first time to boot up the memory device 310 may be mostly done in the factory.

Figure 4:
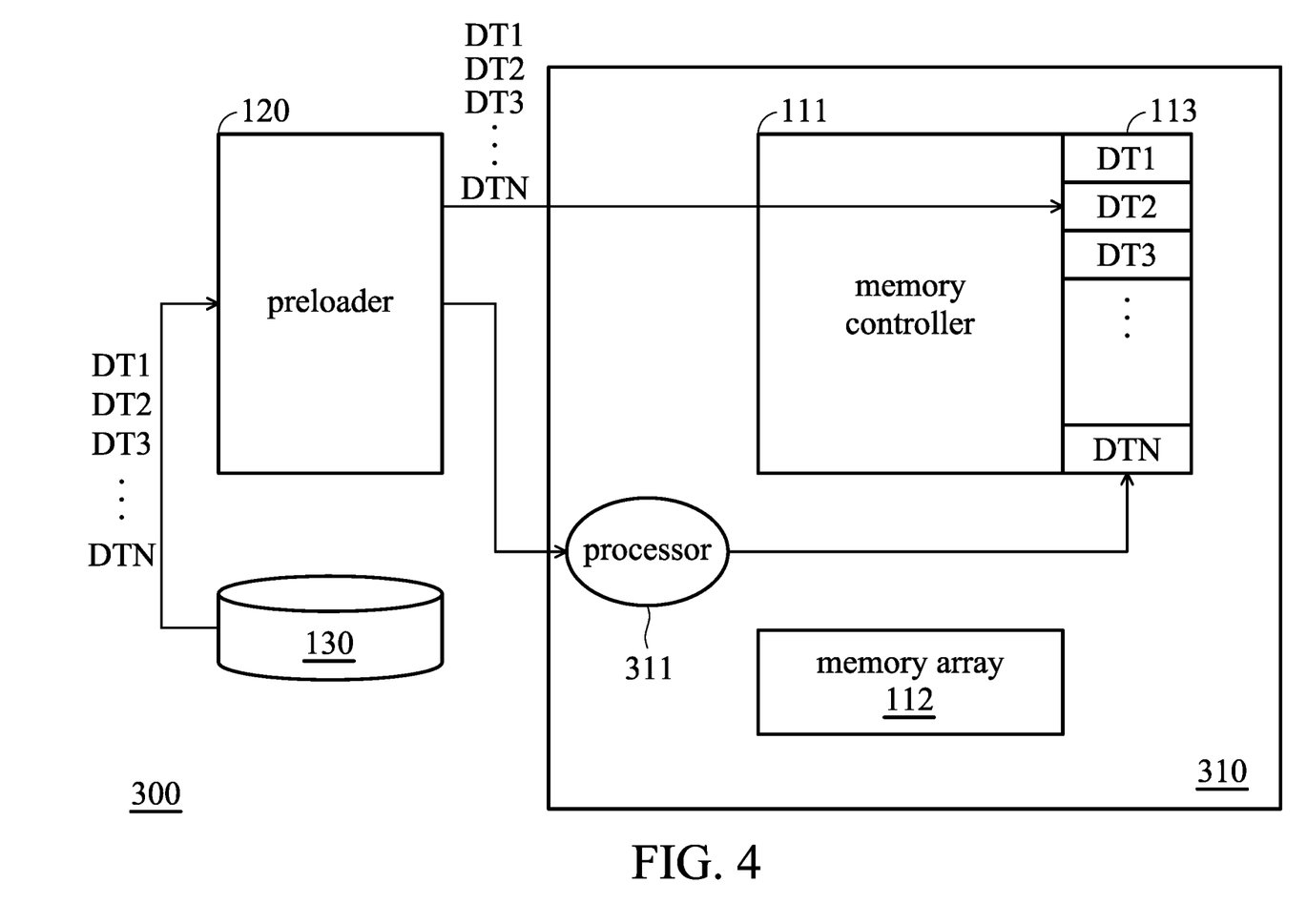
FIG. 4 is a schematic diagram of a semiconductor device in accordance with another embodiment of the invention.

FIG. 4 is a schematic diagram of a semiconductor device in accordance with another embodiment of the invention, in which the preloader 120 boots up the memory device 310 once again. As shown in FIG. 4, when the preloader 120 boots up the memory device 310 once again, the preloader 120 flushes all the first mode data DT1, the second mode data DT2, the third mode data DT3 . . . and the N-th mode data DTN from the non-volatile memory device 130 to the storage device 113, and the processor 311 corrects the respective access parameters corresponding to each of the first mode data DT1, the second mode data DT2, the third mode data DT3 . . . and the N-th mode data DTN according to the operation environment.

For example, after the preloader 120 flushes all the first mode data DT1, the second mode data DT2, the third mode data DT3 . . . and the N-th mode data DTN from the non-volatile memory device 130 to the storage device 113, the processor 311 calibrates the access parameters of the first mode data DT1 according to the operation environment.

When the processor 311 determines that at least one of the access parameters of the first mode data DT1 should be corrected according to the operation environment, the processor 311 only corrects the respective access parameters that should be corrected and keeps others unchanged. Then, the processor 311 calibrates another one of the first mode data DT1, the second mode data DT2, the third mode data DT3 . . . and the N-th mode data DTN, and only corrects the access parameters that should be corrected.

As the manner illustrated in FIG. 4, since the first mode data DT1, the second mode data DT2, the third mode data DT3 . . . and the N-th mode data DTN are flushed from the non-volatile memory device 130 to the storage device 113 all at once, the efficiency is much more significantly improved as there are more modes that the memory device 310 has and the larger the memory array 112 is. In addition, since the access parameters corresponding to each of the first mode data DT1, the second mode data DT2, the third mode data DT3 . . . and the N-th mode data DTN are corrected by the additional processor 311, the resource of CPU (i.e., the preloader 120) can be released at the early stage of initialization, so as to reduce the overall power consumption and to boost the boot-up speed of the whole system.

Figure 5:
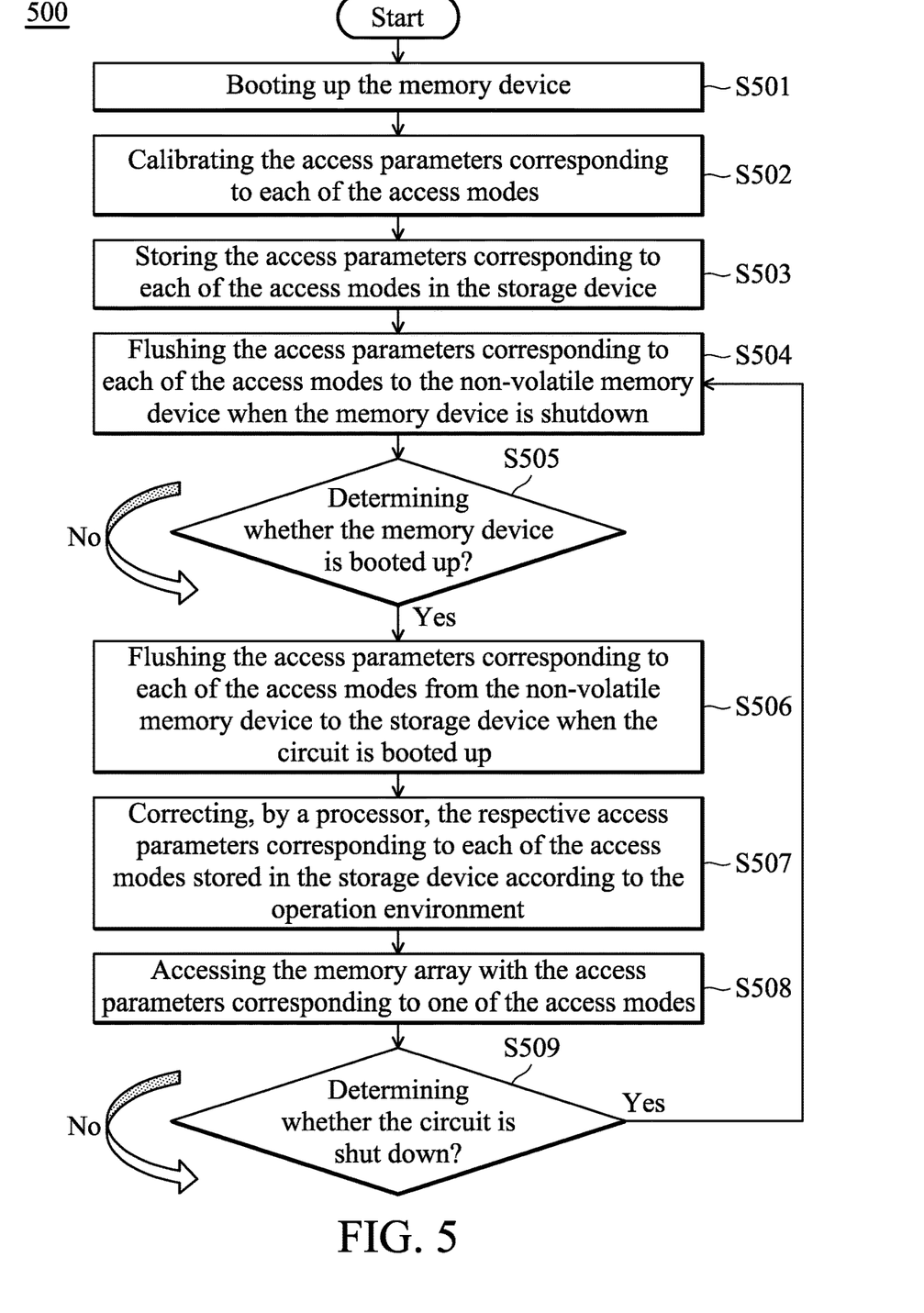
FIG. 5 is a flow chart of an operation method in accordance with an embodiment of the invention.

FIG. 5 is a flow chart of an operation method in accordance with an embodiment of the invention. In the following discretion, the operation method 500 is described with FIGS. 3 and 4 for further explanation.

As shown in FIG. 5, the preloader 120 boots up the memory device 310 (Step S501), and calibrates the access parameters corresponding to each of the first access mode MD1, the second access mode MD2, the third access mode MD3 . . . and the N-th access mode MDN (Step S502). After the calibration, the preloader 120 stores the access parameters corresponding to each of the first access mode MD1, the second access mode MD2, the third access mode MD3 . . . and the N-th access mode MDN in the storage device (Step S503).

As illustrated in FIG. 3, when the preloader 120 boots up the memory device 310, the preloader 120 performs an initialization operation on the memory device 310 to calibrate the operations and communication between the memory controller 111 and the memory array 112 based on each of the first mode access mode MD1, the second mode access mode MD2, the third mode access mode MD3 . . . and the N-th mode access mode MDN.

Then, the preloader 120 stores the calibrated access parameters in the storage device 113 as the first mode data DT1, the second mode data DT2, the third mode data DT3 . . . and the N-th mode data DTN. Accordingly, the memory controller 111 operates the memory array 112 based on the first mode access mode MD1, the second mode access mode MD2, the third mode access mode MD3 . . . and the N-th mode access mode MDN.

Referring to FIG. 5, when the memory device 310 is shut down, all the access parameters corresponding to the first mode data DT1, the second mode data DT2, the third mode data DT3 . . . and the N-th mode data DTN are flushed from the storage device 113 to the non-volatile memory device 130 (Step S504).

As illustrated in FIG. 3, when the memory device 310 is shut down after the initialization operation, the first mode data DT1, the second mode data DT2, the third mode data DT3 . . . and the N-th mode data DTN in the storage device 113 are flushed to the non-volatile memory device 130 as the backup signal BCK. In other words, the first mode data DT1, the second mode data DT2, the third mode data DT3 . . . and the N-th mode data DTN in the storage device 113 to the non-volatile memory device 130 as the backup signal BCK are retained in the non-volatile memory device 130 during the memory device 310 is shut down.

According to some embodiments of the invention, the very first time that the memory device 310 is booted up and shut down is performed in Step S501 to Step S504, which may be done in the factory. In other words, Step S504 to Step S509 may be executed during users' operation. In Step S509, determining whether the memory device 310/the circuit is shut down.

Referring to FIG. 5, the preloader 120 further determines whether the memory device 310 is booted up (Step S505). When the memory device 310 is booted up, the preloader 120 restores the first mode data DT1, the second mode data DT2, the third mode data DT3 . . . and the N-th mode data DTN from the non-volatile memory device 130 to the storage device 113 (Step S506).

Referring to FIG. 4, when the preloader 120 boots up the memory device 310 once again, the preloader 120 flushes the first mode data DT1, the second mode data DT2, the third mode data DT3 . . . and the N-th mode data DTN from the non-volatile memory device 130 to the storage device 113. Namely, the first mode data DT1, the second mode data DT2, the third mode data DT3 . . . and the N-th mode data DTN obtained in Step S502 are restored in the storage device 130.

Referring to FIG. 5, after the first mode data DT1, the second mode data DT2, the third mode data DT3 . . . and the N-th mode data DTN are restored in the storage device 130 in Step S506, the processor 311 corrects the respective access parameters corresponding to each of the first mode data DT1, the second mode data DT2, the third mode data DT3 . . . and the N-th mode data DTN according to the operation environment (Step S507). Accordingly, the memory controller 111 accesses the memory array 112 with the access parameters corresponding to one of the first mode data DT1, the second mode data DT2, the third mode data DT3 . . . and the N-th mode data DTN stored in the storage device 113 (Step S508).

Referring to FIG. 4, after the first mode data DT1, the second mode data DT2, the third mode data DT3 . . . and the N-th mode data DTN are restored in the storage device 130, the preloader 120 is released and the processor 311 takes over to calibrate the access parameters corresponding to each of the first mode data DT1, the second mode data DT2, the third mode data DT3 . . . and the N-th mode data DTN, and corrects at least one of the access parameters that should be corrected.

According to an embodiment of the invention, the preloader 120 is the CPU executing DRAM driver. Since the preloader 120 is released after the access parameters corresponding to the first mode data DT1, the second mode data DT2, the third mode data DT3 . . . and the N-th mode data DTN are flushed into storage device 113, the resource of CPU may be utilized for other devices' initialization, leading to power saving and time saving.

In addition, since the processor 311 only corrects at least one of the access parameters that should be corrected based on the access parameters flushed from the non-volatile memory device 130 to the storage device 113, the time required for calibrating and correcting the access parameters is significantly reduced, compared to the calibration illustrated in FIG. 2.

When the access parameters corresponding to the first mode data DT1, the second mode data DT2, the third mode data DT3 . . . and the N-th mode data DTN are calibrated and corrected, the memory controller 111 accesses the memory array 112 based on the access parameters corresponding to one of the first mode data DT1, the second mode data DT2, the third mode data DT3 . . . and the N-th mode data DTN.

As the memory array 112 is larger and there are more modes that the memory device 310 has, the time required for initializing the memory device 310 is less. According to some embodiments of the invention, when the memory device 310 has 4 channels, 8 GB capacity, and 9 access modes, the time for initialization can be less than one-tenth, compared to that in FIG. 2.

Apparatuses and operation methods thereof for DRAM initialization are provided herein. Since the access parameters are flushed to the storage device and only the access parameter that should be corrected is corrected, the time for initialization can be significantly reduced, which is up to one-tenth. In addition, when the access parameter that should be corrected is corrected, the resource of CPU is released and the calibration and correction is handover to the additional processor in the memory device, the time for initializing the whole apparatus should be reduced as well. Furthermore, since the processor corrects the access parameters based on those flushed to the storage device, the time for correction is reduced to further improve the time for the memory device's initialization.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
   a memory device, comprising:
   a memory array;
   a storage device, storing access parameters corresponding to a plurality of access modes;
   a memory controller, accessing the memory array with the access parameters corresponding to one of the access modes;
   a non-volatile memory device, storing all the access parameters corresponding to all of the access modes; and
   a preloader, booting up the memory device;
   wherein when the memory device is booted up, the memory controller flushes the access parameters corresponding to all of the access modes from the non-volatile memory device to the storage device; and
   wherein when the memory device is shut down, the preloader flushes the access parameters corresponding to each of the access modes from the storage device to the non-volatile memory device.

2. The apparatus as defined in claim 1, wherein when the preloader boots up the memory device for a first time, the preloader calibrates the access parameters corresponding to each of the access modes, and then stores the access parameters corresponding to each of the access modes in the storage device.

3. The apparatus as defined in claim 2, wherein when the preloader boots up the memory device once again, the preloader flushes the access parameters corresponding to each of the access modes from the non-volatile memory device to the storage device.

4. The apparatus as defined in claim 3, wherein memory device further comprises:
   a processor, wherein when the preloader boots up the memory device once again, the processor corrects the respective access parameters corresponding to each of the access modes stored in the storage device according to an operation environment after the preloader flushes the access parameters corresponding to each of the access modes from the non-volatile memory device to the storage device.

5. The apparatus as defined in claim 4, wherein the preloader is a central processing unit executing a memory driver;
   wherein when the processor corrects the respective access parameters corresponding to each of the access modes stored in the storage device, the central processing unit is released and able to initialize other devices.

6. The apparatus as defined in claim 1, wherein the non-volatile memory device is a flash memory.

7. An operation method adapted to a memory device, wherein the memory device comprises a memory array and a storage device, wherein the operation method comprises:
   booting up the memory device;
   flushing access parameters corresponding to a plurality of access modes to the storage device when the memory device is booted up;
   accessing the memory array with the access parameters corresponding to one of the access modes stored in the storage device;
   using a preloader to calibrate the access parameters corresponding to each of the access modes when the memory device is booted up for the first time;
   storing the access parameters corresponding to each of the access modes in the storage device after the step of calibrating the access parameters corresponding to each of the access modes; and
   flushing the access parameters corresponding to each of the access modes from a non-volatile memory device to the storage device when the memory device is booted up once again.

8. The operation method as defined in claim 7, further comprising:
   flushing all the access parameters corresponding to each of the access modes from the storage device to the non-volatile memory device when the memory device is shut down.

9. The operation method as defined in claim 8, further comprising:
   using a processor to correct the respective access parameters corresponding to each of the access modes stored in the storage device according to an operation environment after the step of flushing the access parameters corresponding to all of the access modes from the non-volatile memory device to the storage device when the circuit is booted up once again.

10. The operation method as defined in claim 9, wherein the preloader is a central processing unit executing a memory driver;

wherein the non-volatile memory device is a flash memory;

wherein when the respective access parameters corresponding to each of the access modes are corrected by the processor, the central processing unit is released and able to initialize other devices.

* * * * *